United States Patent [19]

Hotta et al.

[11] Patent Number: 4,769,415

[45] Date of Patent: Sep. 6, 1988

[54] RESIN COMPOSITION

[75] Inventors: Masahiro Hotta, Kashiwa; Tadasu Inoue, Matsudo, both of Japan

[73] Assignee: Dainippon Plastics Co., Ltd., Osaka, Japan

[21] Appl. No.: 59,895

[22] Filed: Jun. 9, 1987

[51] Int. Cl.$^4$ .............................................. C08L 53/02
[52] U.S. Cl. .................................. 525/89; 524/505; 525/95; 525/932; 525/940
[58] Field of Search ................... 525/89, 95, 932, 940; 524/505

[56] References Cited

U.S. PATENT DOCUMENTS

| | | | |
|---|---|---|---|
| 3,433,573 | 3/1969 | Holladay et al. | 525/240 |
| 3,562,356 | 2/1971 | Nyberg et al. | 525/93 |
| 4,140,162 | 2/1979 | Gajewski et al. | 524/291 |
| 4,423,190 | 12/1983 | Fukawa et al. | 525/89 |
| 4,440,815 | 5/1983 | Zomorodi et al. | 524/505 |
| 4,493,919 | 1/1985 | Durbin et al. | 525/89 |
| 4,530,966 | 7/1985 | Shiraki et al. | 525/89 |
| 4,588,777 | 5/1986 | Hotta | 525/93 |

FOREIGN PATENT DOCUMENTS 61-176654 8/1986 Japan .

Primary Examiner—Allan M. Lieberman
Attorney, Agent, or Firm—Armstrong, Nikaido, Marmelstein & Kubovcik

[57] ABSTRACT

A resin composition comprising a block copolymer which comprises an intermediate block of a hydrogenated conjugated diene polymer and terminal blocks of an aromatic vinyl compound polymer, the composition being characterized in that the composition comprises:
(a) 20 to 90 parts by weight of a block copolymer having terminal blocks in an amount of about 10 to about 20% by weight based on the copolymer (a), and
(b) 80 to 10 parts by weight of a block copolymer mixed with the copolymer (a) and having terminal blocks in an amount of about 25 to about 35% by weight based on the copolymer (b).

5 Claims, No Drawings

RESIN COMPOSITION

BACKGROUND OF THE INVENTION

1. Field of the Invention

The present invention relates to a resin composition, and more particularly to a polymer composition which is excellent in softness, transparency and moldability or shapability.

2. Description of the Prior Art

Molding resin materials having excellent softness and transparency recently used include block copolymers which comprise an intermediate block (about 5,000 to about 125,000 in number average molecular weight) of a hydrogenated conjugated diene polymer, such as ethylene-butylene copolymer or ethylene-propylene copolymer, and terminal blocks (about 10,000 and about 300,000 in number average molecular weight) of an aromatic vinyl compound copolymer, such as polystyrene (U.S. Pat. Nos. 4,140,162 and 4,588,777).

Such block copolymers are obtained usually by the hydrogenation of block polymers having the structure of (vinyl aromatic polymer block)-(conjugated diene polymer block)-(vinyl aromatic polymer block), such as polystyrene-polybutadiene-polystyrene structure or polystyrene-polyisoprene-polystyrene structure. The degree of hydrogenation of the conjugated diene polymer block is at least 90%. Although it appears likely that the aryl of the vinyl aromatic polymer blocks will also be hydrogenated during the hydrogenation, the degree of hydrogenation thereof is less than 10% at its highest. Thus, it is thought that only the conjugated diene polymer block is substantially subjected to hydrogenation.

However, these block copolymers are not satifactorily moldable by extrusion or injection when singly used. For example, the block copolymer, when in the form of particles, powders or flakes, is difficult to make into molding pellets or is in no way extrudable into sheets or tubes. Actually, therefore, such block copolymers are used as spread in the form of a flowable organic solvent solution, or as blended with some other resin such as polyolefin, or as mixed with plasticizers, oils, etc. into a moldable composition.

Nevertheless, the spreading of the copolymer in the form of a solution needs a cumbersome procedure and further requires much labor and cost for completely removing the residual solvent. Blending with other resin or addition of plasticizer, oil and the like alters the properties such as transparency, softness and strength, not infrequently giving a composition which is unsatisfactory for the contemplated use.

Accordingly, it has been desired to provide a resin material which retains the excellent properties of the block copolymer in respect of transparency, softness, strength, etc. and which nevertheless has high moldability or shapability.

The present invention has been accomplished in view of these problems.

When a block copolymer (a) having terminal blocks in an amount of about 10 to about 20% by weight based on the copolymer was used alone, it was actually impossible to prepare pellets from this copolymer by a continuous operation because when pellets were to be prepared by extrusion, the copolymer exhibited high tackiness and low viscosity, rendering the resulting strands difficult to take up. Further even if the copolymer was extruded through a T-die or tubular die, it was impossible to continuously wind up the extrudate. Thus, it was impossible to extrude the copolymer directly into sheets or tubes. While a block copolymer (b) which comprises terminal blocks in an amount of about 25 to about 35% by weight based on the copolymer (b) was used alone, problems were also encountered with this copolymer. When the copolymer was extruded for the preparation of pellets, the resulting strands were markedly rough-surfaced, developing numerous large crevices in an extreme case, so that it was actually difficult to prepare pellets. Accordingly, it was totally impossible to extrude the copolymer into tubes or sheets.

We have conducted intensive research and various experiments in order to improve the moldability or extrudability of the foregoing block copolymers and consequently discovered the surprising fact that whereas the block copolymer (a) and the block copolymer (b) fall into the category of the foregoing block copolymers and were not actually extrudable when singly used, these copolymers (a) and (b) exhibit excellent moldability or extrudability when used in combination. The present invention has been accomplished based on this finding.

SUMMARY OF THE INVENTION

Accordingly, the present invention provides a resin composition comprising a block copolymer which comprises an intermediate block of a hydrogenated conjugated diene polymer and terminal blocks of an aromatic vinyl compound polymer, the composition being characterized in that the composition comprises:

(a) 20 to 90 parts by weight of a block copolymer having terminal blocks in an amount of about 10 to about 20% by weight based on the copolymer (a), and (b) 80 to 10 parts by weight of a block copolymer mixed with the copolymer (a) and having terminal blocks in an amount of about 25 to about 35% by weight based on the copolymer (b).

The resin composition of the invention exhibits excellent moldability without necessitating any other particular polymer component, plasticizer, oil or the like and is useful for preparing various extruded or molded articles of which transparency, softness, weather resistance, etc. are required.

DESCRIPTION OF THE PREFERRED EMBODIMENT

Examples of conjugated diene polymers for forming on hydrogenation the intermediate block of the block copolymers to be used in the invention are polybutadiene, polyisoprene, polychloroprene and the like which are about 10,000 to about 300,000, preferably about 30,000 to about 200,000, in number average molecular weight. Among these examples, polybutadiene and polyisoprene are desirable. Aromatic vinyl compound polymers constituting both terminal blocks of block copolymers useful for the invention include styrene polymers such as polystyrene, poly-α-methylstyrene, poly-p-methylstyrene, polychlorostyrene and the like, which are preferably 5,000 to 125,000, more preferably about 10,000 to about 60,000, in number average molecular weight. The most preferable of these examples is polystyrene.

The block copolymers are preferably about 20,000 to about 400,000, more preferably about 40,000 to about 300,000, in overall number average molecular weight.

Among such block copolymers, it is desirable from the viewpoint of heat resistance, weather resistance, etc. to use those which have been fully hydrogenated, such that the intermediate block thereof is at least 95% in the degree of hydrogenation. In the case where the intermediate block is, for example, polybutadiene, this block substantially has the structure of ethylenebutylene copolymer when hydrogenated. In the case where the intermediate block is polyisoprene, the block substantially has the structure of ethylene-propylene copolymer when hydrogenated.

According to the present invention, two kinds of block copolymers (a) and (b) are used. The block copolymer (a) comprises about 10 to about 20% by weight of terminal blocks based on the copolymer. The block copolymer (b) comprises about 25 to about 30% by weight of terminal blocks based on the copolymer (b). When the block copolymer (a) comprises less than 10% by weight of terminal blocks, the resulting composition exhibits excessive tackiness when in a molten state and is therefore difficult to mold or extrude continuously, whereas if the terminal block content is in excess of 20% by weight, the composition fails to afford a smooth-surfaced extrudate and is therefore unsuited. On the other hand, when the block copolymer (b) comprises less than 25% by weight in terminal block content, the composition is excessively tacky while in a molten state and is difficult to extrude continuously. When the content exceeds 35% by weight, the composition gives a markedly rough-surfaced extrudate and a product of undesirable softness and transparency. Most preferably, the combined terminal block proportion is 12 to 18% by weight for the block copolymer (a) and 26 to 32% by weight for the block copolymer (b). The components (a) and (b) may each comprise a mixture of copolymers.

Further the ratio, (a):(b), of the block copolymer (a) to the block copolymer (b) is suitably 20–90 parts by weight: 80–10 parts by weight (the combined amount equals 100 parts by weight). If the amount of the block copolymer (a) is less than 20 parts by weight, the composition provides a markedly rough-surfaced extrudate and is unable to form a smooth-surfaced sheet by extrusion. When the amount exceed 90 parts by weight, the composition exhibits greatly increased tackiness and is not continuously extrudable into pellets or sheets. Most preferably, the (a):(b) ratio is 25–80 parts by weight:-75–20 parts by weight.

The block copolymer (a) is readily available, for example, under the brand name and with the grade number of KRATON G-1657, and the block copolymer (b), KRATON G-1650 or -1652 (both products of Shell Chemical Co.) or Tuftec HR-1041 (product of Asaki Chemical Co., JAPAN).

The mixture of the block copolymers (a) and (b) in the above-specified ratio is readily extrudable into pellets in a molten state, whereas the conventional copolymers were difficult to extrude into pellets. The resulting pellets can be easily made into smooth-surfaced transparent and soft sheets or tubes or various other shaped products using a usual extruder or injection molding machine. Preferably, the mixture is prepared by a known kneader or blender.

It is further possible to incorporate into the resin composition of the invention small amounts of other resins (up to about 5% if largest), plasticizers, antiblocking agents, thermal stabilizers, antioxidants, ultraviolet absorbers, lubricants, coloring agents, etc. insofar as much substances will not be detrimental to the effect achieved by the invention.

The present composition is usable for various industrial materials, household articles, etc. because of its transparency, softness and weather resistance.

More specifically, the present composition is usable for molding or extruding tubes such as tubes for piping systems for cleaning electronic parts, dehumidifier tubes, tubes for medical devices and apparatus, vender piping tubes, etc. and for extruding sheets such as lining or laminating materials for garment fabrics, intermediate resin layers for composite glass sheets, belt backings, etc. Accordingly, the present invention also provides such molded or extruded products of various types.

The present invention will be described with reference to the following examples, which, however, in no way limit the invention.

EXAMPLE 1

In a Henschel mixer, 70% by weight of KRATON G-1657 (product of Shell Chemical Co., composed of polystyrene terminal blocks and a hydrogenated intermediate block of ethylene-butylene copolymer in the former-to-latter weight ratio of 14/86) serving as the component (a) and 30% by weight of KRATON G-1650 (product of Shell Chemical Co., composed of terminal blocks of polystyrene and a hydrogenated intermediate block of ethylene-butylene copolymer in the former-to-latter weight ratio of 28/72) serving as the component (b) were mixed together at room temperature and then extruded under the following conditions to prepare pellets. The operation was carried out smoothly with no problem.

| Cylinder temperature (°C.) | | | |
| --- | --- | --- | --- |
| $C_1$ | $C_2$ | $C_3$ | Die temperature (°C.) |
| 180 | 190 | 200 | 210 |

The pellets were extruded into a sheet under the following conditions by an extruder having a diameter of 40 mm and equipped with a coat hanger type die.

| Screw | |
| --- | --- |
| l/d: | 28 |
| Compression ratio: | 4.0 |
| Cylinder temperature (°C.) | |
| $C_1$: | 210 |
| $C_2$: | 225 |
| $C_3$: | 235 |
| Adapter temperature (°C.): | 240 |
| Die temperature (°C.) | |
| $D_1$: | 240 |
| $D_2$: | 240 |
| $D_3$: | 240 |
| Take-up roll temperature (°C.): | 60 |

The sheet obtained was about 0.4 mm in thickness, highly transparent, colorless and soft and had rubber-like elasticity.

When it was attempted to prepare pellets only from the above component (a), it was impossible to continuously take up the strands owing to high tackiness and low viscosity. When it was further attempted to prepare pellets from the component (b) alone, the strands obtained had numerous large crevices in its surface, failing to give pellets.

EXAMPLE 2

The same components (a) and (b) as used in Example 1 were mixed together in varying ratios to prepare pellets and sheets. The results are given below.

| No. | Component (a) | Component (b) | Extrudability into pellets Continuous take-up | Extrudability into pellets Surface state | Extrudability into sheet Continuous take-up | Extrudability into sheet Surface state |
|---|---|---|---|---|---|---|
| 1 | 10 | 90 | Impossible | Numerous large crevices | — | — |
| 2 | 15 | 85 | " | Crevices | — | — |
| 3 | 20 | 80 | Possible | Rough | Possible | Good |
| 4 | 40 | 60 | " | Good | Possible | " |
| 5 | 60 | 40 | " | " | " | " |
| 6 | 80 | 20 | " | " | " | " |
| 7 | 90 | 10 | " | Slightly rough | Possible | " |
| 8 | 95 | 5 | Impossible | Rough | Impossible | Good |

As the proportion of the component (b) increased, the mixture exhibited higher viscosity in a molten state, so that the extrusion temperature was set to a gradually slightly elevated level.

Compositions No. 3 to No. 7 are within the scope of the invention, while compositions No. 1, No. 2 and No. 8 are outside the scope of the invention. When preparing sheets from compositions No. 3 and No. 7, the distance between the die outlet and the take-up roll was reduced. This made it possible to continuously take up the resulting sheet.

EXAMPLE 3

KRATON G-1657 serving as the component (a) and KRATON G-1652 (the same as KRATON G-1650 in composition but lower in molecular weight) serving as the component (b) were mixed together in varying ratios in an attempt to prepare pellets and sheets. The results are listed below. Since each composition was lower than the corresponding composition in Example 2 in melting temperature, the extrusion temperature was set to about 10° C. lower level.

| No. | Component (a) | Component (b) | Extrudability into pellets Continuous take-up | Extrudability into pellets Surface state | Extrudability into sheet Continuous take-up | Extrudability into sheet Surface state |
|---|---|---|---|---|---|---|
| 1 | 0 | 100 | Impossible | Numerous large crevices | — | — |
| 2 | 10 | 90 | " | Numerous large crevices | — | — |
| 3 | 15 | 85 | " | Many crevices | — | — |
| 4 | 20 | 80 | Possible | Rough | Possible | Good |
| 5 | 40 | 60 | " | Good | Possible | " |
| 6 | 60 | 40 | " | " | " | " |
| 7 | 80 | 20 | " | " | " | " |
| 8 | 90 | 10 | " | Slightly rough | Possible | " |
| 9 | 95 | 5 | Impossible | Very rough | Impossible | Good |

Compositions No. 4 to No. 8 are within the scope of the invention, while compositions No. 1, No. 2, No. 3 and No. 9 are outside the scope.

COMPARATIVE EXAMPLE

KRATON G-1650 and KRATON G-1652, both falling into the category of component (b), were mixed together in the ratio of 50/50 in an attempt to prepare pellets. However, the strands obtained had crevices in the surface, were markedly rough-surfaced and could not be continuously taken up.

EXAMPLE 4

An 80% by weight of KRATON G-1657, 20% by weight of KRATON G-1650 and stearic acid in an amount of 0.2 part by weight per 100 parts by weight of these resins were mixed together and made into pellets. The pellets were extruded into a tube under the following conditions.

| Cylinder temperature (°C.) | | | Die temperature (°C.) |
|---|---|---|---|
| $C_1$ | $C_2$ | $C_3$ | |
| 190 | 210 | 230 | 230 |

The tube obtained was transparent and soft and had a smooth glossy surface.

What is claimed is:

1. A resin composition comprising a blend of
   (a) 20 to 90 parts by weight of a first block copolymer having terminal blocks in an amount of about 10–20% by weight based on the weight of the first block copolymer, and
   (b) 80 to 10 parts by weight of a second block copolymer having terminal blocks in an amount of about 25–35% by weight based on the weight of the second block copolymer, said first and second block copolymers each comprising an intermediate block of a hydrogenated conjugated diene polymer having a number average molecular weight of about 10,000–300,000 and terminal blocks of an aromatic vinyl polymer having a number average molecular weight of about 5,000–125,000, the intermediate blocks of said block copolymers being at least 95% hydrogenated, wherein the total of said first block copolymer and said second block copolymer is equal to 100 parts by weight.

2. The resin composition of claim 1 in which the hydrogenated conjugated diene polymer is a hydrogenated polybutadiene or polyisoprene.

3. The resin composition of claim 1 in which the aromatic vinyl compound polymer is polystyrene, poly-α-methylstyrene or poly-p-methylstyrene.

4. The resin composition of claim 1 containing 25 to 80 parts by weight of the first block copolymer and 75 to 20 parts by weight of the second block copolymer.

5. The resin composition of claim 1 which is molded or extruded to form a sheet or tube.

* * * * *